(12) United States Patent
Oumi

(10) Patent No.: US 11,325,257 B2
(45) Date of Patent: May 10, 2022

(54) OPERATION PROGRAM CREATION DEVICE

(71) Applicant: Fanuc Corporation, Yamanashi (JP)

(72) Inventor: Tatsuya Oumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 258 days.

(21) Appl. No.: 16/598,193

(22) Filed: Oct. 10, 2019

(65) Prior Publication Data

US 2020/0156248 A1 May 21, 2020

(30) Foreign Application Priority Data

Nov. 16, 2018 (JP) .............................. JP2018-215370

(51) Int. Cl.
*B25J 9/16* (2006.01)
*B25J 13/00* (2006.01)

(52) U.S. Cl.
CPC .......... *B25J 9/1671* (2013.01); *B25J 9/1664* (2013.01); *B25J 9/161* (2013.01); *B25J 13/00* (2013.01); *G05B 2219/40311* (2013.01)

(58) Field of Classification Search
CPC ...... B25J 9/1671; B25J 9/1605; B25J 9/1664; B25J 9/1656; B25J 9/1658; B25J 9/161; G05B 13/04; G05B 19/425; G05B 19/4202; G05B 2219/40311; G05B 19/41885; A61B 34/10
See application file for complete search history.

(56) References Cited

U.S. PATENT DOCUMENTS

| 2004/0189631 | A1 | 9/2004 | Kazi et al. |
| 2005/0004709 | A1 | 1/2005 | Watanabe et al. |
| 2006/0069464 | A1 | 3/2006 | Nagatsuka et al. |

(Continued)

FOREIGN PATENT DOCUMENTS

| DE | 10305384 A1 | 8/2004 |
| DE | 102015004932 A1 | 10/2015 |

(Continued)

OTHER PUBLICATIONS

German Office Action dated Feb. 17, 2022; Application No. 102019130008.8.

*Primary Examiner* — Khoi H Tran
*Assistant Examiner* — Tanner L Cullen
(74) *Attorney, Agent, or Firm* — Shackelford, Bowen, McKinley & Norton, LLP

(57) ABSTRACT

The operation program creation device includes, an input unit, a storage unit that stores path data indicating a path along which predetermined position of the robot should pass for an operation of the robot to the workpiece, and a control unit which creates the operation program corresponding to the path data when the control unit receives, from the input unit, a start request for creating or renewing the operation program for the operation, wherein the control unit is capable of changing a position of at least one of the robot and the workpiece relative to each other based on an input to the input unit, the control unit provides predetermined notification information when a relative position between the robot and the workpiece when the start request is received is different from the relative position at the time when the operation program for the workpiece was created.

2 Claims, 3 Drawing Sheets

(56) References Cited

U.S. PATENT DOCUMENTS

| | | | |
|---|---|---|---|
| 2006/0181236 A1* | 8/2006 | Brogardh | G05B 19/4083 318/568.1 |
| 2008/0154428 A1* | 6/2008 | Natatsuka | B25J 9/1656 700/258 |
| 2015/0032257 A1* | 1/2015 | Hashiguchi | B25J 9/1674 700/248 |
| 2015/0277398 A1* | 10/2015 | Madvil | G05B 13/04 700/97 |
| 2015/0306768 A1 | 10/2015 | Liang et al. | |
| 2016/0059413 A1 | 3/2016 | Ogata | |
| 2019/0314998 A1* | 10/2019 | Yui | B25J 9/163 |
| 2020/0130184 A1* | 4/2020 | Suzuki | B25J 9/1676 |

FOREIGN PATENT DOCUMENTS

| | | | |
|---|---|---|---|
| EP | 1640840 A2 | | 3/2006 |
| EP | 1498792 B1 | | 12/2010 |
| EP | 2923805 A2 | | 9/2015 |
| EP | 2993542 A2 | | 3/2016 |
| JP | 03022106 A | * | 1/1991 |
| JP | 2001-328087 A | | 11/2001 |
| JP | 2006-099260 A | | 4/2006 |
| JP | 2011156605 A | * | 8/2011 |
| JP | 2012024867 A | * | 2/2012 |
| JP | 2012-101306 A | | 5/2012 |
| JP | 2016078185 A | * | 5/2016 |

\* cited by examiner

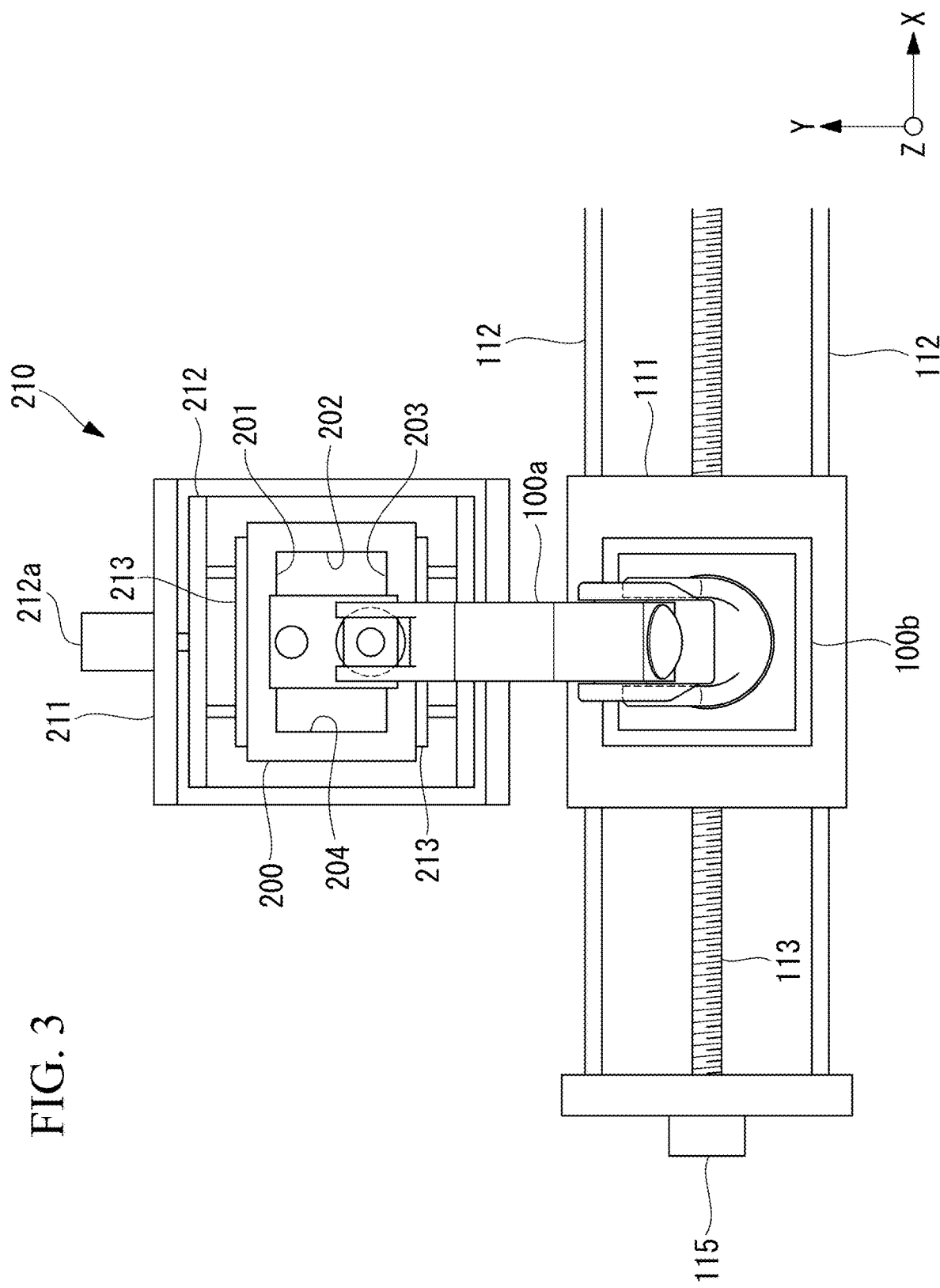

OPERATION PROGRAM CREATION DEVICE

CROSS-REFERENCE TO RELATED APPLICATIONS

This application is based on and claims priority to Japanese Patent Application No. 2018-215370 filed on Nov. 16, 2018, the content of which is incorporated herein by reference in its entirety.

TECHNICAL FIELD

The present invention relates to an operation program creation device.

BACKGROUND ART

Conventionally, an operation program creation device (simulation unit) is known, for creating an operation program offline using a robot model, a workpiece model, a peripheral unit model, and the like (cf., PTL 1).

CITATION LIST

Patent Literature

{PTL 1}
Japanese Unexamined Patent Application, Publication No. 2001-328087

SUMMARY OF INVENTION

A first aspect of the present disclosure provides an operation program creation device that uses a robot and a workpiece in simulation so as to create an operation program for the robot, the operation program creation device including: an input unit; a storage unit that stores path data indicating a path along which a predetermined position of the robot should pass for an operation of the robot to the workpiece; and a control unit which creates the operation program corresponding to the path data when the control unit receives, from the input unit, a start request for creating or renewing the operation program for the operation, wherein the control unit is capable of changing a position of at least one of the robot and the workpiece relative to each other, the control unit provides predetermined notification information, when a relative position between the robot and the workpiece when the start request is received is different from a referential relative position that is the relative position at the time when the operation program for the workpiece was created.

A second aspect of the present disclosure provides an operation program creation device that uses a robot and a workpiece in simulation so as to create an operation program for the robot, the operation program creation device including: an input unit; a storage unit that stores path data indicating a path along which a predetermined position of the robot should pass for an operation of the robot to the workpiece; and a control unit which creates the operation program corresponding to the path data when the control unit receives from the input unit, a start request for creating or renewing the operation program for the operation, wherein the control unit is capable of changing a position of at least one of the robot and the workpiece relative to each other based on an input to the input unit, the control unit moves one of the robot and the workpiece to a referential relative position that is the relative position at the time when the operation program for the workpiece was created, when a relative position between the robot and the workpiece when the start request is received is different from the referential relative position.

BRIEF DESCRIPTION OF DRAWINGS

FIG. 3 is a plan view of the model used for the operation program creation device according to this embodiment.

DESCRIPTION OF EMBODIMENTS

Hereinafter, an operation program creation device according to one embodiment of the present invention will be described with reference to the drawings.

Figure 1:
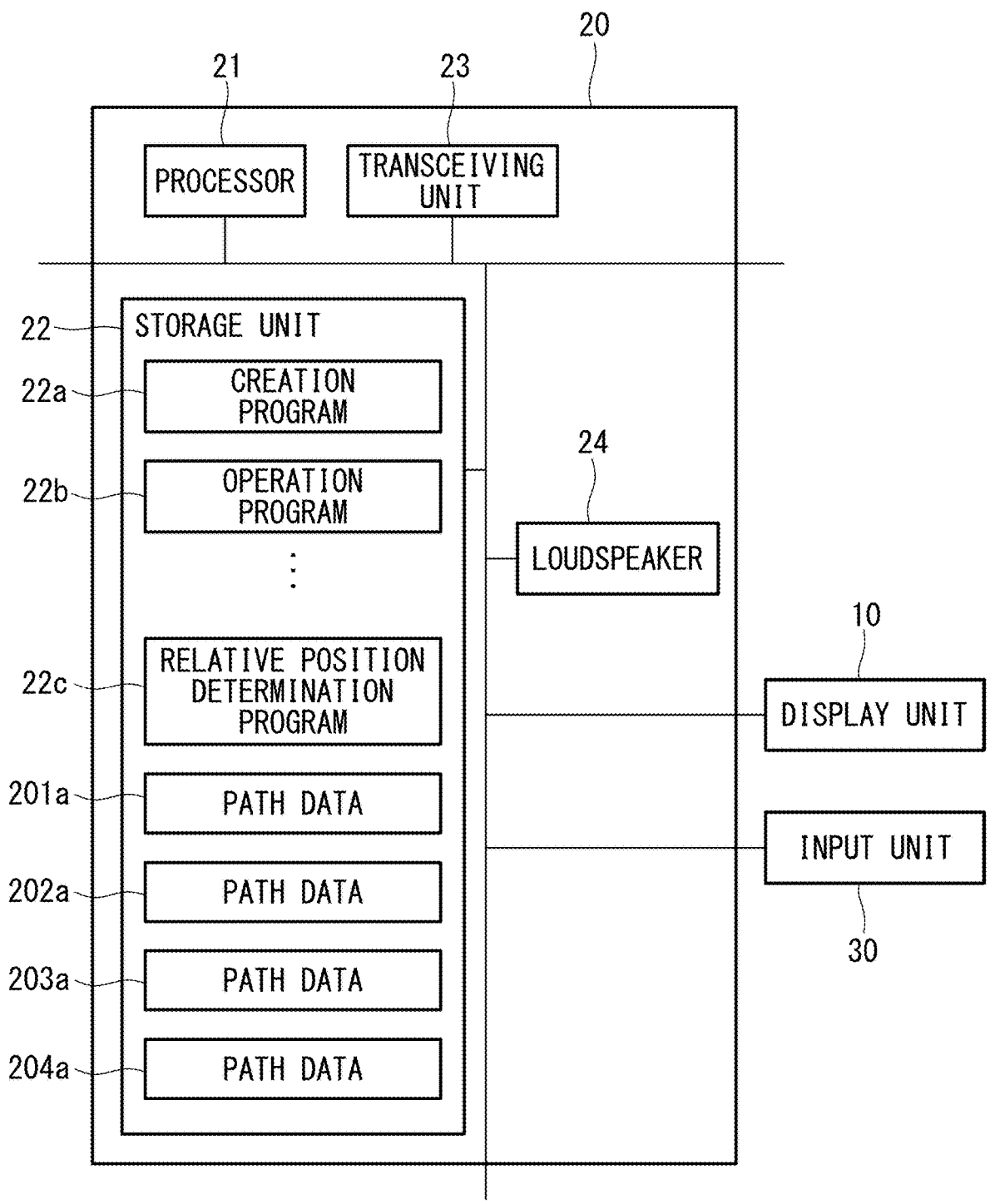
FIG. 1 is a configurational diagram of an operation program creation device according to one embodiment of the present invention.

As shown in FIG. 1, the operation program creation device of the present invention includes: a display unit 10 such as a liquid crystal display unit that an operator sees, for example; a control unit 20 connected to the display unit 10; and an input unit 30 such as a keyboard, a mouse, or the like that is connected to the control unit 20.

The control unit 20 includes: a processor 21 as a CPU or the like; a storage unit 22 having a non-volatile storage, a ROM, a RAM, or the like; a transceiving unit 23 having a connecting port to which a communication cable is connected and an antenna, and configured to perform transmission and reception of data; and a loudspeaker 24. The input unit 30 may include a touch-screen. In this embodiment, the display unit 10 has a touch-screen function, and the display unit 10 serves a part of a function of the input unit 30. Here, the display unit 10 may be a tablet computer.

Figure 2:
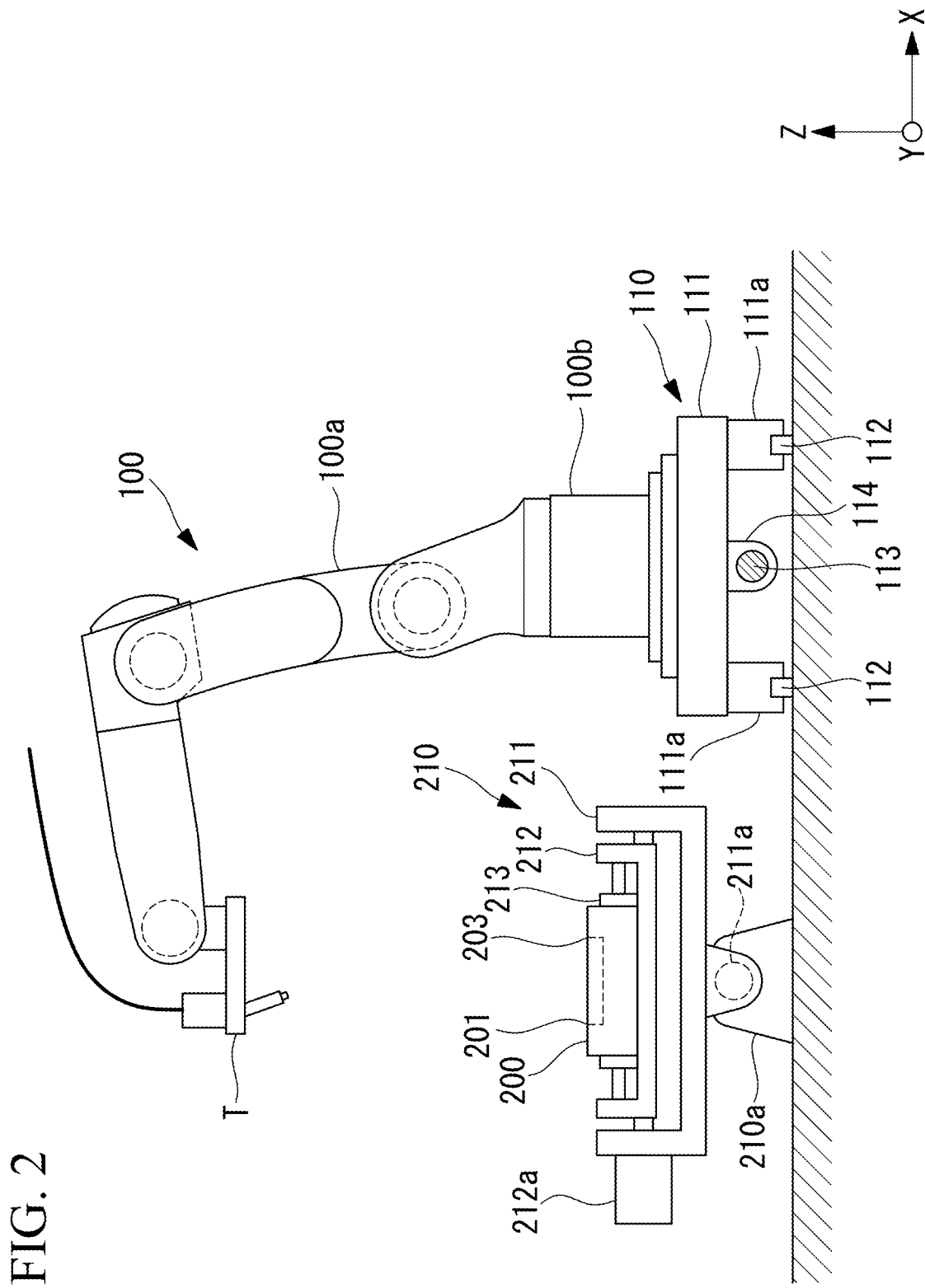
FIG. 2 is a front view of a model used for the operation program creation device according to this embodiment.

The storage unit 22 stores a creation program 22a for creating an operation program 22b of a robot by performing simulation of the robot. Further, the storage unit 22 stores a relative position determination program 22c. Moreover, the storage unit 22 stores a robot model 100 used for simulation, a robot transfer carriage model 110 for moving the robot model 100, a workpiece model 200, and a workpiece supporting unit model 210. Examples of these models are shown in FIG. 2 and FIG. 3. In the following description, the robot model 100, the robot transfer carriage model 110, the workpiece model 200, and the workpiece supporting unit model 210 are often simply referred to as a robot 100, a robot transfer carriage 110, a workpiece 200, and a workpiece supporting unit 210.

In this embodiment, the robot 100 is a vertical articulated robot, but may be a horizontal articulated robot, a parallel link robot, or a robot of a different type. The robot 100 includes an arm 100a, and a base 100b that supports a base end section of the arm 100a. The base 100b is supported by the robot transfer carriage 110. The arm 100a includes a plurality of arm members and servomotors that respectively drive the arm members. By driving the arm members by the respective servomotors, a position and orientation of the arm 100a gradually changes. An actual robot corresponding to the robot model 100 is connected to a robot control device, which controls the robot's operation using the operation program 22b.

The arm 100a has a tool T at its tip end for performing an operation to the workpiece 200. The tool T may be a tool that performs various operations. Examples of the tool T include a welding gun, a deburring tool, a painting tool, a seal adhesive application tool, a laser cutting tool, a machine cutting tool and hand.

The robot transfer carriage 110 includes: a carriage main body 111 to which the base 100b of the robot 100 is attached; rails 112 fixed to an installation surface and extends in an X-axis direction that is a horizontal direction; a ball screw shaft 113 fixed to the installation surface and extends parallel to the rails 112; a ball screw nut 114 fixed to a lower surface of the carriage main body 111; and a motor 115 such as a servomotor for rotary driving the ball screw shaft 113. A pair of sliders 111a provided on the lower surface of the carriage main body 111 are respectively supported by the pair of rails 112, and thereby the carriage main body 111 is capable of moving along the rails 112.

The workpiece supporting unit 210 includes: a base 210a fixed to the installation surface; a first bed 211 supported by the base 210a swingably about a Y axis that extends in a horizontal direction perpendicular to the X-axis direction; a first motor 211a, such as a servomotor, provided on the base 210a or the first bed 211 and for causing the first bed 211 to swing with respect to the base 210a; a second bed 212 supported by the first bed 211 swingably about an X axis; a second motor 212a, such as a servomotor, provided on the first bed 211 or the second bed 212, and for causing the second bed 212 to swing with respect to the first bed 211; and a chuck 213 for fixing the workpiece 200 at a predetermined position on the second bed 212.

An actual robot transfer carriage and an actual workpiece supporting unit that respectively correspond to the robot transfer carriage model 110 and the workpiece supporting unit model 210 are connected to the robot control device, which controls, using the operation program 22b, operations of the motor of the robot transfer carriage and the first motor and the second motor of the workpiece supporting unit.

Positions of the robot model 100, the robot transfer carriage model 110, the workpiece model 200, and the workpiece supporting unit model 210 in simulation respectively correspond to actual installation positions.

The control unit 20 operates based on the creation program 22a, and creates or updates the operation program 22b. At this time, the control unit 20 creates or updates the operation program 22b using path data 201a, 202a, 203a, and 204a stored in the storage unit 22, for example.

The path data 201a, 202a, 203a, and 204a respectively correspond to welding sides (operational objects) 201, 202, 203, and 204 of the workpiece 200, and the path data 201a, 202a, 203a, and 204a are data indicating path along which predetermined position of the tool T of the robot 100 should pass for an operation to the workpiece 200. In each of the path data 201a, 202a, 203a, and 204a, a path along which the predetermined position of the tool T is located may be shown as a group of points. The path data 201a, 202a, 203a, and 204a may be automatically calculated based on CAD data of the workpiece 200 and a type of the tool T.

When making or updating the operation program 22b, the operator sets a position of the robot transfer carriage 110 in the X-axis direction using the input unit 30. With this, a position of the workpiece supporting unit 210 with respect to the robot 100 is set in simulation. Further, the operator sets inclination of the first bed 211 and the second bed 212 of the workpiece supporting unit 210 using the input unit 30. At this time, the operator may input operational positions of the first motor 211a and the second motor 212a. With this, a position and orientation of the workpiece 200 with respect to the robot 100 is set in simulation.

Subsequently, the operator selects, for example, the path data 201a out of the path data 201a, 202a, 203a, and 204a using the input unit 30, and inputs a predetermined input to start program creation using the input unit 30. The input to start may be input using the display unit 10 that functions as a touch-screen. Based on the input to start, the control unit 20 creates or updates the operation program 22b for an operation to the welding side 201. The operation program 22b may include information of the operational positions of the motor 115, the first motor 211a, and the second motor 212a when the operation program 22b is set.

The setting of the position and orientation of the workpiece 200 with respect to the robot 100 is determined by the operator based on the operator's experience and the like. Further, operating efficiency of the robot 100, locations of periphery facilities, operating conditions of the periphery facilities, relationship between an upstream process flow and a downstream process flow, and the like are considered when setting the position and orientation of the workpiece 200 with respect to the robot 100. For example, when the robot 100 also performs an operation to a device other than the workpiece supporting unit 210, the operator moves the robot 100 in front of the other device using the robot transfer carriage 110. The operation program 22b is created or updated to the other device in the same manner, and there is a case in which the making or the updating is performed before the operation program 22b for the workpiece 200 is fully created.

In other words, there may be a case in which the robot 100 is moved in front of the other device in simulation by inputting the position of the robot transfer carriage 110 to the input unit 30 after making the operation program 22b for the operation to the welding side 201, and then the operation program 22b for the welding sides 202-204 is created.

When the operation program 22b for the welding sides 202-204 is created, the operator moves the robot 100 in front of the workpiece supporting unit 210 by inputting the position of the robot transfer carriage 110 to the input unit 30.

It is generally preferable that the position of the robot transfer carriage 110 at this time is a position at which the operation program 22b for the welding side 201 was created. For this purpose, the operator inputs the position of the robot transfer carriage 110 when the operation program 22b for the welding side 201 was created to the input unit 30.

However, during the various operations described above, the operator carries out checking of the operation of the robot 100 based on the operation program that was created, fine-tuning of the position of the robot transfer carriage 110, fine-tuning of the position of the workpiece 200, alteration of the orientation of the workpiece 200, and the like in simulation. By the operator carrying out the various operations described above, there is a case in which the operator inputs, to the input unit 30, a position that is different from the position of the robot transfer carriage 110 at the time when the operation program 22b for the welding side 201 was created.

When the input to start for making of the operation program 22b for the welding sides 202-204 is input to the input unit 30, the control unit 20 makes determination based on the relative position determination program 22c. The determination is to determine whether or not a relative position (referential relative position) between the robot 100 and the workpiece 200 at the time when the operation program 22b for the welding side 201 was created is identical with a relative position at the time when inputs to start for the welding sides 202-204 were made.

Then, the control unit 20 provides predetermined notification information, if a current relative position and the referential relative position are different based on the relative position determination program 22c. Examples of the predetermined notification information include showing indication that the two relative positions are different in the display unit 10, predetermined indication on the display unit 10 for inquiring whether or not the robot 100 is to be moved by the robot transfer carriage 110 to the relative position when the operation program 22b for the welding side 201 was created, and outputting predetermined sound and voice from the loudspeaker 24.

The predetermined indication may be an operating unit (such as a button) for resuming the relative position at the time when the operation program 22b for the welding side 201 was created, and the operating unit may be operated on the display unit 10 of a touch panel type by the operator. When the operating unit is operated, in order to resume the relative position at the time when the operation program 22b for the welding side 201 was created, the control unit 20 moves the robot 100 or the workpiece 200 in simulation. The movement is carried out by the robot transfer carriage 110 or the workpiece supporting unit 210. The operating unit may be provided in the input unit 30.

There is a case in which the operator intentionally changes the current relative positions from the referential relative position. Therefore, the above configuration allowing selection of whether or not to resume the relative position at the time when the operation program 22b for the welding side 201 was created is beneficial.

On the other hand, when the current relative position is different from the referential relative position, the control unit 20 may automatically move the workpiece 200 or the robot 100 so that the workpiece 200 is positioned at the referential relative position with respect to the robot 100, or that the robot 100 is positioned at the referential relative position with respect to the workpiece 200. In this case, the operator is able to create or update the operation program 22b for the welding sides 201-204 smoothly in a short time.

It should be noted that in the above description the robot 100 is moved mainly by the robot transfer carriage 110. On the other hand, when the operation program 22b for each of the welding sides 202-204 is created, there is a case in which the operator sets the first bed 211 and/or the second bed 212 at a wrong angular position that is different from the position at the time when the operation program 22b for the welding side 201 was created using the input unit 30.

In this case, similarly, the relative position at the time of the starting input for creating the operation program 22b for each of the welding sides 202-204 changes with respect to the relative position (referential relative position) between the robot 100 and the workpiece 200 at the time when the operation program 22b for the welding side 201 was created. Specifically, the relative position between the welding sides 201-204 of the workpiece 200 and the robot 100 changes according to the orientation of the workpiece 200.

At this time, similarly, the control unit 20 provides predetermined notification information, if a current relative position and the referential relative position are different based on the relative position determination program 22c.

The robot control device controls the actual robot, and carries out the operation of the robot to the workpiece using a series of operation programs 22b created or updated in the above manner.

In this embodiment, the operator is able to learn, based on the predetermined notification information, that the relative position between the robot 100 and the workpiece 200 at the time when the start request was received from the input unit 30 is different from the relative position at the time when the operation program 22b for the workpiece 200 was previously created. Therefore, for example, even when the operator creates and checks the operation program 22b for various operations for several hours or longer, while repeating checking of the operation of the robot 100 in simulation by the created operation program 22b and alteration of the relative position between the robot 100 and the workpiece 200, it is possible to reduce or eliminate a possibility of the operation program 22b being created in a state in which the relative position between the robot 100 and the workpiece 200 is in an unintended state.

Further, in this embodiment, the control unit 20 shows the predetermined indication, using the display unit 10, for inquiring whether or not the robot 100 or the workpiece 200 is to be moved to the relative position at the time when the operation program 22b for the workpiece 200 was previously created. Therefore, for example, in a case in which the operator wishes to use the relative position at the time when the operation program 22b was previously created, such an operation may be easily and reliably carried out.

Moreover, in this embodiment, the control unit 20 receives, via the input unit 30, a request for moving the robot 100 or the workpiece 200 to the relative position at the time when the operation program 22b for the workpiece 200 was previously created. Therefore, the operator is able to move the robot 100 or the workpiece 200 to the relative position at the time when the operation program 22b was previously created, easily and reliably using the input unit 30.

It should be noted that the above embodiment describes the case in which when the operation program 22b for the welding sides 202-204 is created, the operator places the robot 100 or the workpiece 200 at a wrong relative position different from the relative position at the time when the operation program 22b for the welding side 201 was created.

On the contrary, there is a case in which when the operation program 22b for the welding side 201 is again created, the robot 100 or the workpiece 200 is placed at a wrong relative position that is different from the previous relative position. In this case, similarly, the predetermined notification information or the automatic movement of the workpiece 200 or the robot 100 is beneficial.

Further, when the control unit 20 provides the predetermined notification information, one or more of data indicating the position of the robot 100 at the time when the operation program 22b that the control unit 20 previously carried out for the workpiece 200 was created or updated, data indicating the position of the workpiece 200, and the relative position between the robot 100 and the workpiece 200 may be displayed on the display unit 10. When the operation program 22b was previously created or updated for the workpiece 200 for a plurality of times, the data for the creation or update for the plurality of times may be displayed. It is possible to display the operational object corresponding to the data, and date and time of creation or update for the operation program 22b. In this case, the operator is able to select, from displayed data, the position of the robot 100, the position of the workpiece 200, or the relative position between the robot 100 and the workpiece 200.

It should be noted that the operation program creation device may be built-in within the robot control device, or may be within a different device.

Moreover, in place of the workpiece supporting unit 210, the workpiece 200 may be supported by a different robot, by a transfer device such as a conveyer, or by a different device or tool that can support the workpiece 200. Further, as the relative position between the workpiece 200 and the robot 100 is changed by the workpiece supporting unit 210 even when the robot transfer carriage 110 is not provided, the same effect can be provided by the above-described configuration.

From the above-described embodiments, the following aspects of the present disclosure are derived.

A first aspect of the present invention provides an operation program creation device that uses a robot and a workpiece in simulation so as to create an operation program for the robot, the operation program creation device including: an input unit; a storage unit that stores path data indicating a path along which a predetermined position of the robot should pass for an operation of the robot to the workpiece; and a control unit which creates the operation program corresponding to the path data when the control unit receives, from the input unit, a start request for creating or renewing the operation program for the operation, wherein the control unit is capable of changing a position of at least one of the robot and the workpiece relative to each other, the control unit provides predetermined notification information, when a relative position between the robot and the workpiece when the start request is received is different from a referential relative position that is the relative position at the time when the operation program for the workpiece was created.

According to this aspect, an operator is able to learn, based on the predetermined notification information, that the relative position between the robot and the workpiece at the time when the start request was received from the input unit is different from the relative position at the time when the operation program for the workpiece was created. Therefore, for example, even when the operator creates and checks the operation program for several hours or longer, while repeating checking the movement of the robot in the simulation by the created operation program and alteration of the relative position between the robot and the workpiece, it is possible to reduce or eliminate a possibility of the operation program being created in a state in which the relative position between the robot and the workpiece is in an unintended state.

In the above aspect, it is preferable that the control unit makes, as the notification information, a predetermined indication which inquires whether or not one of the robot and the workpiece is to be moved to the referential relative position, using a display unit.

By employing the above configuration, the operator is inquired whether or not the robot or the workpiece is to be moved to the relative position at the time when the operation program was created. Therefore, if the operator wishes to use the relative position at the time when the operation program was created, for example, such an operation may be easily and reliably carried out.

In the above aspect, it is preferable that the control unit receives a request, via the input unit, for moving one of the robot and the workpiece to the referential relative position.

By employing the above configuration, the operator is able to move the robot or the workpiece to the relative position at the time when the operation program was created, easily and reliably using the input unit.

A second aspect of the present invention provides an operation program creation device that uses a robot and a workpiece in simulation so as to create an operation program for the robot, the operation program creation device including: an input unit; a storage unit that stores path data indicating a path along which a predetermined position of the robot should pass for an operation of the robot to the workpiece; and a control unit which creates the operation program corresponding to the path data when the control unit receives from the input unit, a start request for creating or renewing the operation program for the operation, wherein the control unit is capable of changing a position of at least one of the robot and the workpiece relative to each other based on an input to the input unit, the control unit moves one of the robot and the workpiece to a referential relative position that is the relative position at the time when the operation program for the workpiece was created, when a relative position between the robot and the workpiece when the start request is received is different from the referential relative position.

According to this aspect, the robot or the workpiece is moved to the referential relative position when the relative position between the robot and the workpiece at the time when the start request was received from the input unit is different from the referential relative position as the relative position at the time when the operation program for the workpiece was created. Therefore, for example, even when the operator creates and checks the operation program for several hours or longer, while repeating checking of the movement of the robot in the simulation by the created operation program and alteration, or the like, of the relative position between the robot and the workpiece, it is possible to reduce or eliminate a possibility of the operation program being created in a state in which the relative position between the robot and the workpiece is in an unintended state.

According to the aforementioned aspects, it is possible to reduce or eliminate a possibility of an operation program being created in a state in which a relative position between a robot and a workpiece are placed is in an unintended state.

REFERENCE SIGNS LIST

10 Display unit
20 Control unit
21 Processor
22 Storage unit
22a Creation program
22b Operation program
22c Relative position determination program
23 Transceiving unit
24 Loudspeaker
30 Input unit
100 Robot model
100a Arm
100b Base
110 Robot transfer carriage model
111 Carriage main body
112 Rail
113 Ball screw shaft
115 Motor
114 Ball screw nut
200 Workpiece model
210 Workpiece supporting unit model
210a Base
211 First bed
211a First motor
212 Second bed
212a Second motor
213 Chuck

The invention claimed is:

1. An operation program creation device that uses a robot and a workpiece in simulation so as to create an operation program for the robot, the operation program creation device comprising:
   an input unit;
   a storage that stores path data indicating a path along which a predetermined position of the robot should pass for an operation of the robot to the workpiece; and
   a controller which creates the operation program corresponding to the path data when the controller receives, from the input unit, a start request for creating or renewing the operation program for the operation;
   wherein the controller is capable of changing a position of at least one of the robot and the workpiece relative to each other based on an input to the input unit,
   wherein the controller provides predetermined notification information when a relative position between the robot and the workpiece when the start request is received is different from a referential relative position that is the relative position at the time when the operation program for the workpiece was created; and
   wherein the controller provides, as the notification information, a predetermined indication which inquires whether or not one of the robot and the workpiece is to be moved to the referential relative position, using a display unit.

2. The operation program creation device according to claim 1, wherein the controller receives a request, via the input unit, for moving one of the robot and the workpiece to the referential relative position.

* * * * *